United States Patent [19]
Kim

[11] Patent Number: 5,710,860
[45] Date of Patent: Jan. 20, 1998

[54] LIGHT-BLOCKING APPARATUS FOR LIQUID CRYSTAL MONITOR OF CAMCORDER

[75] Inventor: Tea Wan Kim, Incheon-si, Rep. of Korea

[73] Assignee: LG Electronics Inc., Seoul, Rep. of Korea

[21] Appl. No.: 642,599

[22] Filed: May 3, 1996

[30] Foreign Application Priority Data

May 4, 1995 [KR] Rep. of Korea .................. 9485/1995

[51] Int. Cl.⁶ ................................................. H04N 5/225
[52] U.S. Cl. .......................................... 386/118; 348/376
[58] Field of Search ............................ 386/118, 117, 386/107; 358/906, 471; 348/207, 222, 239, 374, 373, 376; H04N 5/225

[56] References Cited

U.S. PATENT DOCUMENTS

| | | | |
|---|---|---|---|
| 5,057,933 | 10/1991 | Takahashi | 386/118 |
| 5,136,393 | 8/1992 | Seo | 386/118 |
| 5,303,062 | 4/1994 | Kawarai et al. | 386/118 |
| 5,469,271 | 11/1995 | Hoshino et al. | 386/118 |

*Primary Examiner*—Robert Chevalier

[57] ABSTRACT

A light-blocking apparatus for a liquid crystal monitor for a camcorder is disclosed including a coupling member fixed to a liquid crystal monitor body; a supporting member rotatably installed in the inner lower portion of the coupling member; a upper and lower light-blocking member rotatably installed in the inner upper portion of the supporting member; and one-side and other-side light-blocking members rotatably and elastically installed on the inner left and right sides of the liquid crystal monitor body.

5 Claims, 5 Drawing Sheets

LIGHT-BLOCKING APPARATUS FOR LIQUID CRYSTAL MONITOR OF CAMCORDER

BACKGROUND OF THE INVENTION

The present invention relates to a light-blocking apparatus for a liquid crystal monitor of a camcorder, and more particularly, to a light-blocking apparatus for preventing external light from entering the liquid crystal monitor during photographing.

Generally speaking, a camcorder is an apparatus for recording on magnetic tape the image of an object to be photographed, equipped with a display through which the object photographed can be confirmed. For this display, a view finder or liquid crystal monitor is used. The view finder is inconvenient in its use because a photographer's eye must be in close contact with the view finder in order to identify the object to be recorded on magnetic tape. For this reason, the view finder is hardly used at present. Instead, the liquid crystal monitor is being increasingly used because it allows the user to identify the object photographed even in a distance.

Because the liquid crystal monitor enables the object to be identified in a distance, a camcorder having such a monitor is frequently used to take the user's own picture while positioned at a predetermined place with a tripod. For this purpose, the liquid crystal monitor is installed to be able to rotate by 180°.

Meanwhile, during outdoor photographing, the camcorder with liquid crystal monitor is exposed to direct ray of light such as sunlight. When sunlight is radiated to the liquid crystal monitor, the image displayed on the liquid crystal screen cannot be recognized clearly. This requires a camcorder to have a light-blocking device for interrupting external light illuminated onto the liquid crystal screen during photographing. This light-blocking device would be indispensable unless a liquid crystal screen involving no change even by external light is developed.

A conventional light-blocking apparatus for a camcorder is shown in FIGS. 1, 2 and 3. In FIG. 1, a coupling member 2 is fixed to a liquid crystal body 1, and a pair of hinge pieces 3 and 4 are formed on the left and right inner rear surfaces of the coupling member. A pair of supporting protrusions 5 and 6 are formed on the upper and lower inner sides of the coupling member. One-side hinge shaft 8 formed in the upper and lower portions of one-side light-blocking plate 7 is inserted into one-side hinge piece 3 so that the plate is elastically installed by one-side spring 9 to become openable/closable. The other-side hinge shaft 11 formed in the upper and lower portions of other-side light-blocking plate 10 is inserted into other-side hinge piece 4 so that the plate is elastically installed by other-side spring 12 to become openable/closable. Upper supporting protrusions 5 are inserted into holes 14 formed on the left and right of upper light-blocking plate 13. When photographing is not performed, one-side and other-side light-blocking plates 7 and 10 and upper light-blocking plate 13 are closed.

For photographing, the user holds and pulls protrusion piece 13a formed on upper light-blocking plate 13. Here, upper supporting protrusion 5 formed on coupling member 2 is inserted into hole 14 formed on upper light-blocking plate 13 so that upper light-blocking plate 13 is opened by rotating centering on upper supporting protrusion 5. In this state, when the upper portion of liquid crystal monitor body i is shielded and upper light-blocking plate 13 is opened, one-side and other-side light-blocking plates 7 and 10 receive the resilience force of one-side and other-side springs 9 and 12 and rotate centering on one-side and other-side hinge shafts 8 and 11 because one-side and other-side hinge shafts 8 and 11 formed on one-side and other-side light-blocking plates 7 and 10 are inserted into one-side and other-side hinge pieces 3 and 4 formed on coupling member 2. By doing so, the light-blocking blocking plates are automatically opened to shield the left and right portions of liquid crystal monitor body 1 so that external light incident on the three faces of the liquid crystal monitor is interrupted as shown in FIG. 1.

In FIG. 2, coupling member 2 is fixed to liquid crystal monitor body 1, and a pair of hinge pieces 3 and 4 are formed on the left and right inner rear surfaces of the coupling member. A pair of supporting protrusions 5 and 6 are formed on the upper and lower inner sides of the coupling member. One-side hinge shaft 8 formed in the upper and lower portions of one-side light-blocking plate 7 is inserted into one-side hinge piece 3 so that the plate is elastically installed by one-side spring 9 to become openable/closable. The other-side hinge shaft 11 formed in the upper and lower portions of other-side light-blocking plate 10 is inserted into other-side hinge piece 4 so that the plate is elastically installed by other-side spring 12 to become openable/closable. Upper supporting protrusions 5 are inserted into holes 14 formed on the left and right of upper light-blocking plate 13. Lower supporting protrusions 6 are inserted into holes 16 of lower light-blocking plates 15.

For photographing, when the user holds and pulls the end of closed upper light-blocking plate 13 and the end of lower light-blocking plate 15, upper and lower light-blocking plates 13 and 15 are rotated and opened centering on upper and lower supporting protrusions 5 and 6 because they are inserted into holes 14 and 16 formed in the upper and lower light-blocking plates. In this state, when the upper and lower portions of liquid crystal monitor body 1 are shielded and upper and lower light-blocking plates 13 and 15 are opened, one-side and other-side light-blocking plates 7 and 10 receive the resilience force of one-side and other-side springs 9 and 12 and rotate centering on one-side and other-side hinge shafts 8 and 11 because one-side and other-side hinge shafts 8 and 11 formed on one-side and other-side light-blocking plates 7 and 10 are inserted into one-side and other-side hinge pieces 3 and 4 formed on coupling member 2. By doing so, the light-blocking plates are automatically opened to shield the left and right portions of liquid crystal monitor body 1 so that external light incident on the four faces of the liquid crystal monitor is interrupted as shown in FIG. 2.

In the structure of FIG. 1 in which external light incident on the three faces of the liquid crystal monitor is interrupted, there is no problem when photographing is performed while the user holds the camcorder. However, when the camcorder is positioned on the ground by using a tripod in order to take the user's own picture through remote control, the liquid crystal monitor must be 180° rotated to confirm the object photographed and displayed on the liquid crystal monitor. For this reason, the upper light-blocking plate is placed lower not to interrupt external light incident on the upper face. Here, the upper light-blocking plate must be detached and then recoupled to a position where external light is interrupted.

In the structure of FIG. 2 where external light incident on the four faces of the liquid crystal monitor body is interrupted, the external light can be effectively interrupted regardless of whether photographing is performed while the monitor is in its normal position or in its 180° rotating position. However, when the photographer confirms the object photographed and displayed on the liquid crystal monitor, its four faces are all shielded to narrow the field of view. This also involves the raise of cost due to the number of components.

SUMMARY OF THE INVENTION

Therefore, it is an object of the present invention to provide a light-blocking apparatus for a liquid crystal monitor for a camcorder in which the three faces of the top and both sides of the liquid crystal monitor are selectively protected from light regardless of whether the monitor is in a normal position or in a 180° rotation position so that external light is not incident on the face blocked.

To accomplish the object of the present invention, there is provided a light-blocking apparatus for a liquid crystal monitor for a camcorder, comprising: a coupling member fixed to a liquid crystal monitor body; a supporting member rotatably installed in the inner lower portion of the coupling member; a upper and lower light-blocking member rotatably installed in the inner upper portion of the supporting member; and one-side and other-side light-blocking members rotatably and elastically installed on the inner left and right sides of the liquid crystal monitor body.

BRIEF DESCRIPTION OF THE ATTACHED DRAWINGS

DETAILED DESCRIPTION OF PREFERRED EMBODIMENT

Figure 1:
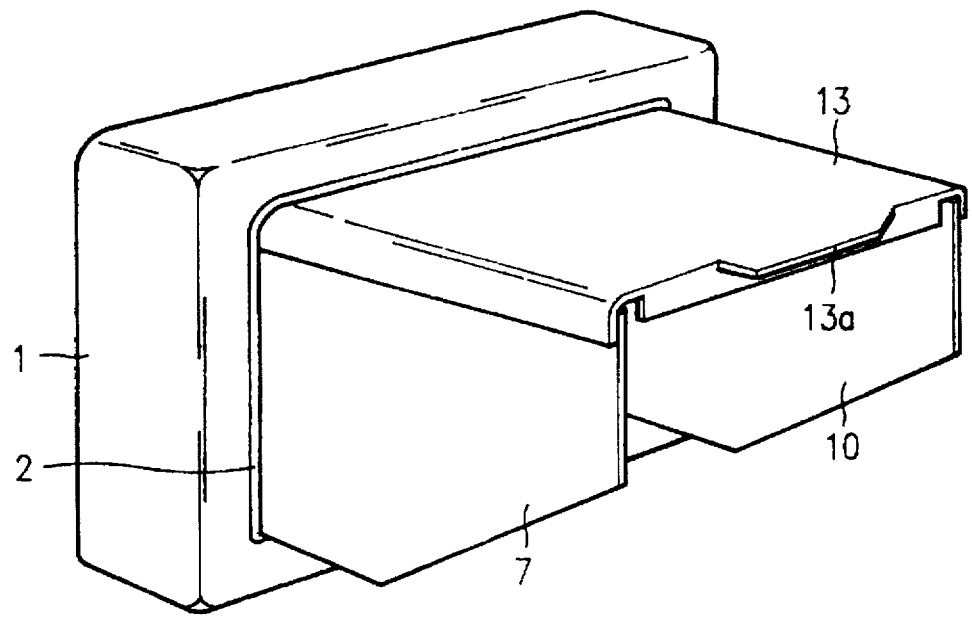
FIG. 1 is a perspective view of one example of a conventional light-blocking apparatus for a liquid crystal monitor of a camcorder.
Figure 2:
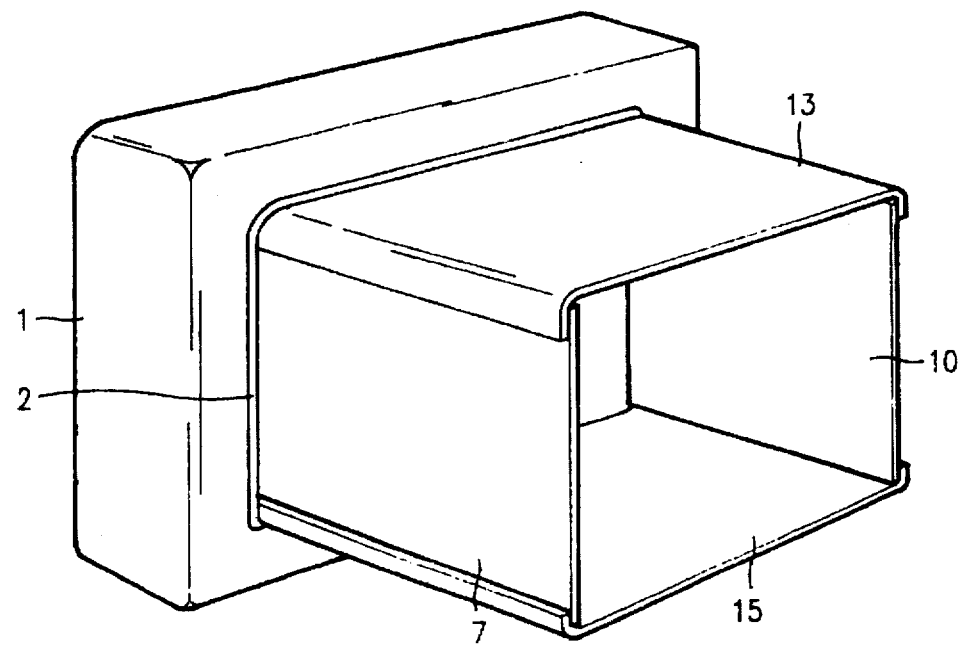
FIG. 2 is a perspective view of another example of a conventional light-blocking apparatus for a liquid crystal monitor of a camcorder.
Figure 3:
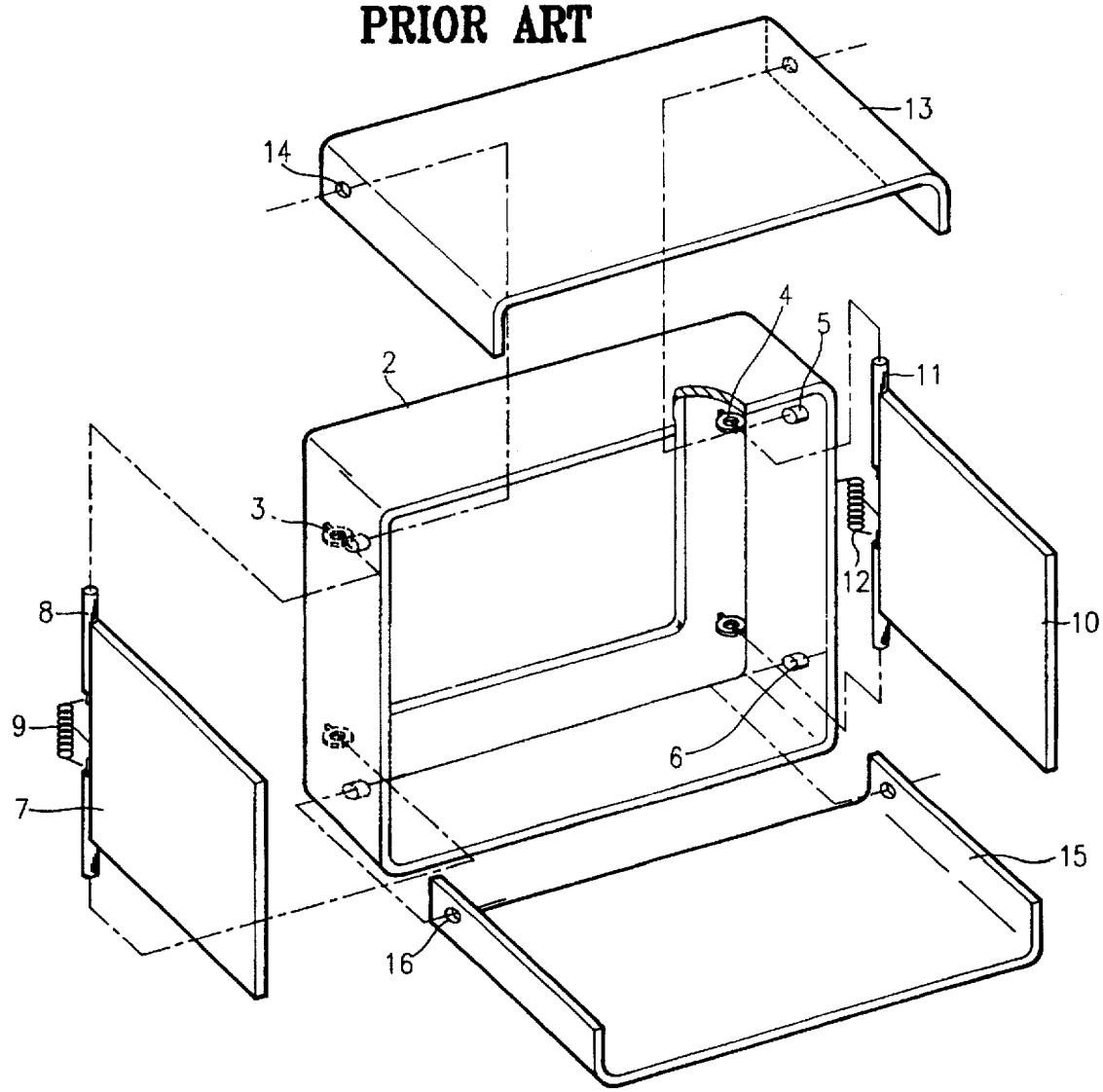
FIG. 3 is an exploded perspective view of the example shown in FIG. 2.
Figure 4:
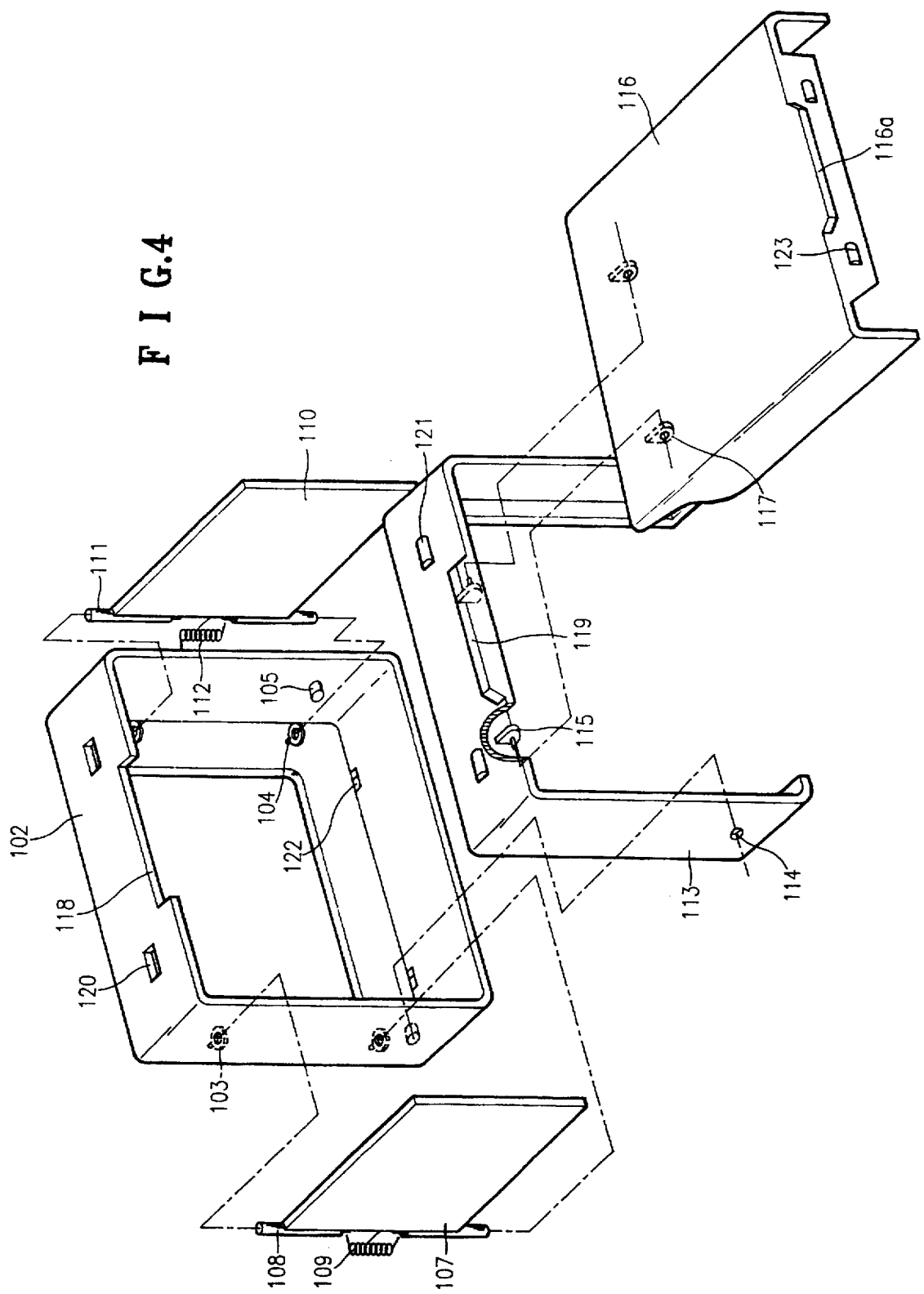
FIG. 4 is an exploded perspective view of important components of a light-blocking apparatus for a liquid crystal monitor of a camcorder according to the present invention.
Figure 5:
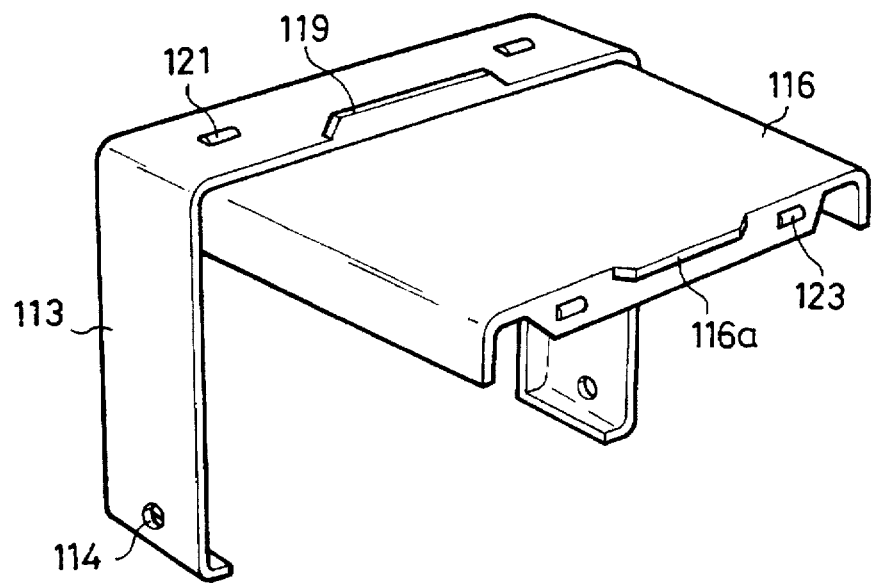
FIG. 5 is a perspective view of the present invention in which the support members and upper and light-blocking members are coupled.

Hereinafter, a preferred embodiment of the present invention will be described with reference to FIGS. 4–7.

In this embodiment, coupling member 102 is fixed to liquid crystal monitor body 101, and a pair of one-side hinge piece 103 and other-side hinge piece 104 are formed on the left and right inner rear surfaces of the coupling member. A pair of lower supporting protrusions 105 are formed in the lower inner sides. One-side hinge shaft 108 formed in the upper and lower portions of one-side light-blocking plate 107 is inserted into one-side hinge piece 103 to be thereby rotatably and elastically installed by one-side spring 109. The other-side hinge shaft 111 formed in the upper and lower portions of other-side light-blocking plate 110 is inserted into other-side hinge piece 104 to be thereby rotatably and elastically installed by other-side spring 112. Lower supporting protrusions 105 are inserted into holes 114 formed on the left and right portions of supporting member 113 so that the light-blocking plates are rotated centering on lower supporting protrusions 105.

A pair of supporting shafts 115 are formed in the upper inner portions of supporting member 113, and a pair of supporting pieces 117 formed on upper and lower light-blocking plate 116 is inserted into supporting shaft 115 of supporting member 113. Therefore, the light-blocking plate is rotated centering on supporting shaft 115. A recess 118 is formed on the top of coupling member 102, and a protrusion piece 119 is formed on the upper outer surface of supporting member 113 so that the supporting member is exposed externally through recess 118 while rotated vertically.

Upper depressions 120 are formed on the top of coupling member 102, and upper stops 121 are formed on the upper outer surfaces of supporting member 113 so that the supporting member is inserted into upper depressions 120 while rotated vertically. Lower depressions 122 are formed on the bottom of coupling member 102, and lower stops 123 are formed on the lower outer surfaces of upper and lower light-blocking plate 116 so that they are inserted into lower depressions 122 while rotated vertically.

In the light-blocking apparatus for a liquid crystal monitor of a camcorder according to the present invention, when photographing is not performed, one-side and other-side light-blocking plates 107 and 110 and upper and lower light-blocking plate 116 is closed. Here, the upper stops 121 formed on supporting member 113 are inserted into upper depressions 120 so that the supporting member is not rotated horizontally unless an artificial rotation force is applied to supporting member 113. Additionally, the lower stops 123 formed on upper and lower light-blocking plate 116 is inserted into lower depressions 122 so that the upper and lower light-blocking plate 116 is not rotated horizontally unless an artificial rotation force is applied thereto. In this state, for photographing, the closed one-side and other-side light-blocking plates 107 and 110 and upper and lower light-blocking plate 116 must be opened.

During normal photographing (while the camcorder is held by the photographer), in order to interrupt external light incident on the three faces of the top and both sides of the monitor, the user holds and pulls protrusion piece 116a formed on upper and lower light-blocking plate 116. Here, the lower stops 123 formed on upper and lower light-blocking plate 116 are drawn out of lower depressions 122 formed on coupling member 102 to release the stop force. The upper and lower light-blocking plate 116 is rotated and horizontally opened centering on supporting shaft 115 because supporting piece 117 formed on upper and lower light-blocking plate 116 is inserted into supporting shaft 115 formed on supporting member 113. In this state, when the upper and lower light-blocking plate 116 are opened, one-side and other-side light-blocking plates 107 and 110 receive the resilience force of one-side and other-side springs 109 and 112 and rotate centering on one-side and other-side hinge shafts 108 and 111 because one-side and other-side hinge shafts 108 and 111 formed on one-side and other-side light-blocking plates 107 and 110 are inserted into one-side and other-side hinge pieces 103 and 104 formed on coupling member 102. By doing so, the light-blocking plates are automatically opened to shield the top and left and right portions of liquid crystal monitor body 101, and therefore, external light incident on the three faces of the monitor is interrupted as shown in FIG. 6A.

During normal photographing (while the camcorder is held by the photographer), in order to interrupt external light incident on the three faces of the bottom and both sides of the monitor, the user holds and pulls protrusion piece 119 formed on supporting member 113 and externally exposed via recess 118 formed on coupling member 102. Here, the upper stops 121 formed on supporting member 113 are drawn out of upper depressions 120 formed on coupling member 102 to release the stop force. The supporting member 113 is rotated and horizontally opened centering on supporting shaft 115 because supporting protrusion 105 formed on coupling member 102 is inserted into hole 114 formed on supporting member 113. In this state, when the supporting member 113 is opened, one-side and other-side light-blocking plates 107 and 110 receive the resilience force of one-side and other-side springs 109 and 112 and rotate centering on one-side and other-side hinge shafts 108 and 111 because one-side and other-side hinge shafts 108 and 111 formed on one-side and other-side light-blocking plates 107 and 110 are inserted into one-side and other-side hinge pieces 103 and 104 formed on coupling member 102. By doing so, the light-blocking plates are automatically opened to shield the bottom and left and right portions of liquid crystal monitor body 101, and therefore, external light incident on the three faces of the monitor is interrupted as shown in FIG. 6B.

Figure 6A:
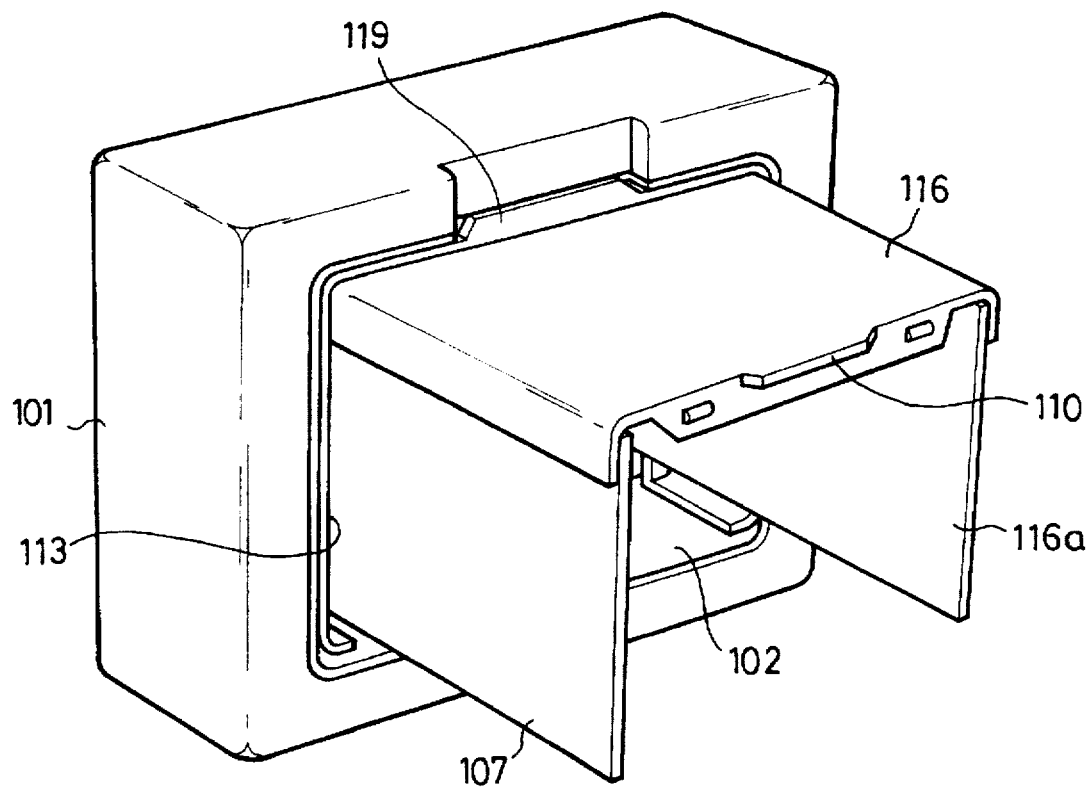
FIG. 6A is a perspective view of the present invention in which the liquid crystal monitor is normally used so that external light incident on the top, left and right portions is interrupted.
Figure 6B:
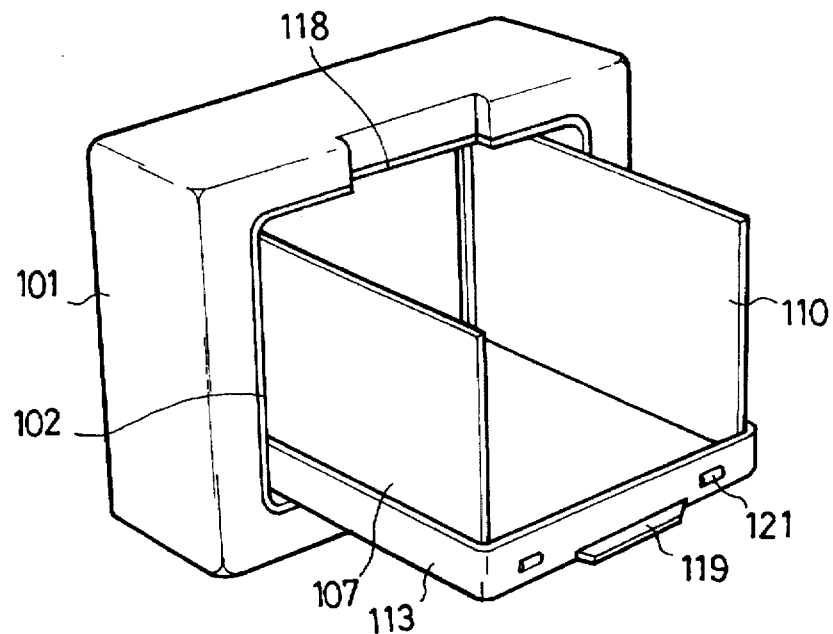
FIG. 6B is a perspective view of the present invention in which the liquid crystal monitor is normally used so that external light incident on the bottom, left and right portions is interrupted.
Figure 7:
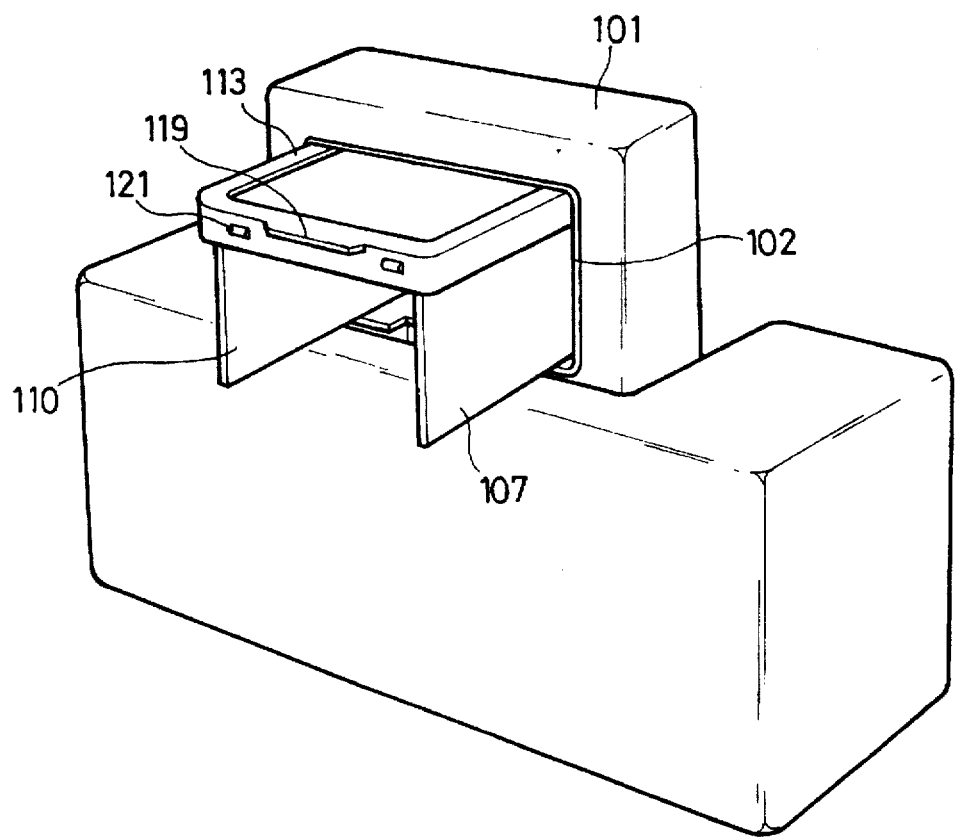
FIG. 7 is a perspective view of the present invention in which the liquid crystal monitor is 180° rotated.

Meanwhile, when the user performs photographing in the normal mode as shown in FIG. 6A and then in the 180° rotation mode (the camcorder being supported by the ground and the user's own picture being taken by remote control) as shown in FIG. 7 while the top and left and right portions of the monitor are shielded from external light, the top of liquid crystal monitor body 101 is shielded so that upper and lower light-blocking plate 116 which interrupts external light incident on the top of the monitor are positioned on the bottom of liquid crystal monitor body 101 as a result. In this state, when photographing is performed, the light incident on the top of the monitor is not interrupted to prevent the object photographed from being confirmed clearly. Accordingly, as shown in FIG. 6A, when the normal photographing is performed and then the monitor is 180° rotated while the top and left and right portions of the monitor are shielded from external light, the upper and lower light-blocking plate 116 is made to shield the bottom of the monitor body 101 as shown in FIG. 6B. Then, when the monitor is rotated by 180°, upper and lower light-blocking plate 116 interrupts external light incident on the top of monitor as shown in FIG. 7. This enables the object photographed and displayed on the monitor to be viewed clearly.

As described above, the light-blocking apparatus for a liquid crystal monitor for a camcorder of the present invention is made so that the upper and lower light-blocking plate is placed on the top or bottom of the monitor body according to the user's selection. For this reason, both in the normal and rotation modes, the external light incident on the top and both sides of the monitor is effectively interrupted together with the left and right light-blocking plates. This allows photographing to be performed at a wide field of view, sharply enhancing the reliability and efficiency of products.

Although the present invention has been described above with reference to the preferred embodiments thereof, those skilled in the art will readily appreciate that various modifications and substitutions can be made thereto without departing from the spirit and scope of the invention as set forth in the appended claims.

What is claimed is:

1. A light-blocking apparatus for a liquid crystal monitor for a camcorder, comprising:

a coupling member fixed to a liquid crystal monitor body;

a supporting member rotatably installed in the inner lower portion of said coupling member;

a upper and lower light-blocking member rotatably installed in the inner upper portion of said supporting member; and one-side and other-side light-blocking members rotatably and elastically installed on the inner left and right sides of said liquid crystal monitor body.

2. A light-blocking apparatus for a liquid crystal monitor for a camcorder as claimed in claim 1, wherein a recess is formed on the top of said coupling member, and a protrusion piece is formed on the outer top of said supporting member so that said protrusion piece is exposed externally via said recess.

3. A light-blocking apparatus for a liquid crystal monitor for a camcorder as claimed in claim 1, wherein a supporting shaft is formed in the inner upper portion of said supporting member, and a supporting piece is formed in said upper and lower light-blocking members so that they are rotatably installed to said supporting member as said supporting piece is inserted into said supporting shaft.

4. A light-blocking apparatus for a liquid crystal monitor for a camcorder as claimed in claim 1, wherein upper depressions are formed on the top of said coupling member, and upper stops are formed on the upper outer surface of said supporting member so that said upper stops are inserted into said upper depressions while said supporting member is vertically positioned.

5. A light-blocking apparatus for a liquid crystal monitor for a camcorder as claimed in claim 1, wherein lower depressions are formed on the bottom of said coupling member, and lower stops are formed on the lower outer surface of said upper and lower light-blocking member so that said lower stops are inserted into said lower depressions while said upper and lower light-blocking member is vertically positioned.

* * * * *